United States Patent
Huang et al.

(10) Patent No.: US 7,200,648 B2
(45) Date of Patent: Apr. 3, 2007

(54) DYNAMIC SEARCHING METHOD OF PROVISIONING INSTANCE IDENTIFIERS

(75) Inventors: Chun-jung Huang, Taipei (TW); Shao-kun Hung, Taipei (TW)

(73) Assignee: Institute For Information Industry, Taipei (TW)

( * ) Notice: Subject to any disclaimer, the term of this patent is extended or adjusted under 35 U.S.C. 154(b) by 788 days.

(21) Appl. No.: 10/400,627

(22) Filed: Mar. 28, 2003

(65) Prior Publication Data
US 2004/0193718 A1  Sep. 30, 2004

(51) Int. Cl.
*G06F 15/16* (2006.01)

(52) U.S. Cl. .................. 709/220; 709/223; 709/218; 707/3; 707/10

(58) Field of Classification Search ........... 709/224, 709/246, 229, 220, 223, 218; 707/3, 10
See application file for complete search history.

(56) References Cited

U.S. PATENT DOCUMENTS

2004/0049574 A1 * 3/2004 Watson et al. ............ 709/224

* cited by examiner

*Primary Examiner*—Rupal Dharia
*Assistant Examiner*—Djenane Bayard
(74) *Attorney, Agent, or Firm*—Bacon & Thomas, PLLC

(57) ABSTRACT

A dynamic searching method of provisioning instance identifiers (PRIDs) is disclosed, which finds available PRIDs used by a network policy in data tables when adding the network policy to a policy database. A last data table without PRID assignment is first founded and then the number of used PRIDs in the last data table is retrieved to determine whether the last data table has an available PRID. If so, a field value for the available PRID is determined by the greatest or smallest field value used by the used PRIDs, or the available PRID is determined and assigned by dynamically comparing a count from a counter with the first and last PRIDs. After all data tables are successfully assigned with corresponding available PRIDs, the network policy is processed completely.

5 Claims, 5 Drawing Sheets

|   | T1 | T2 | T3 | T4 | T5 |
|---|---|---|---|---|---|
| 1 | * | * |   | * | * |
| 2 | * | * | * | * | * |
| 3 | * | * |   |   |   |
| 4 | * |   |   | * |   |
| 5 |   | * |   | * |   |
| 6 |   |   |   | * |   |
| . | . | . | . | . | . |
| . | . | . | . | . | . |
| . | . | . | . | . | . |
| 254 |   |   | * |   |   |
| 255 |   | * | * |   |   |

\* : used PRIDs

☐ : unused PRIDs

FIG. 4

DYNAMIC SEARCHING METHOD OF PROVISIONING INSTANCE IDENTIFIERS

BACKGROUND OF THE INVENTION

1. Field of the Invention

The present invention relates to a searching method and, more particularly, to a dynamic searching method of provisioning instance identifiers (PRIDs) suitable for data tables of a network policy database.

2. Description of Related Art

Internet is widely accepted and used by various enterprises as information technologies are improved day by day. Accordingly, networking is implemented by increasing networks and communications, so that network configuration and management become more complex. However, human administrators are hard to completely own a variety of required knowledge and skills to manage more and more new devices. To overcome it, a policy-based network management (PBNM) system has been developed to offer administrators in determining specific policies according to required services and management and storing the specific policies in a network policy database. Thus, the system can automatically perform the PBNM system based on rules and conditions of the specific policies determined. For example, dominance of configuration, bandwidth and the like, warranties of network quality of service (QoS), or network security management services like Virtual Private Network (VPN) and so on, such that administrators need not to configure all network equipment one by one.

Typical PBNM is generally applied to Common Open Policy Server protocol usage for policy provisioning (COPS-PR) module and dominates a plurality of tables and corresponding PRIDs by means of table index management mechanism in a form of policy information base (PIB). This is because network management is a relational database management. In such a management, a system cannot know how many data tables may be used by a network policy until the policies are completely inputted by the network administrator. As such, the relation in the relational database is not applicable to associate with the relationship between data tables. Therefore, when network policies are stored in a policy database, PRIDs must be used to associate with data between data tables.

As cited, a plurality of data tables is defined in PIB. Further, each data table defines a plurality of PRIDs to respectively guide to particular storage spaces and indicate total data storage available in the data table. For example, if a number of 255 storage records in total is set to a data table, PRID numbers for the data table are sequentially assigned as 1 to 255. Also, due to a plurality of data tables used by a network policy in general, each data table is searched for available PRID(s) in order to be filled with instruction data associated with actions to be performed by the network policy.

However, available PRIDs are automatically numbered in data tables by increasing logic and thus the PRID number is increased successively. Even though a network administrator deletes and changes original network policy so that some PRIDs become empty in corresponding data tables, the system will search those after the last PRID used, i.e., skipping the middle PRIDs not used before, when adding any new network policy. For example, if the $1^{st}$, $2^{nd}$, $3^{rd}$, $5^{th}$ and $6^{th}$ PRIDs in a data table have been filled with data, the $7^{th}$ PRID is next used in the data table in case of an new network policy added, and thus the $4^{th}$ PRID is automatically skipped. In this case, range tolerance like the cited 255 is easily exceeded in a corresponding data table and this also causes resource waste and makes a limit when storing network policy data.

Therefore, it is desirable to provide an improved method to mitigate and/or obviate the aforementioned problems.

SUMMARY OF THE INVENTION

An object of the present invention is to provide a dynamic searching method of provisioning instance identifiers (PRIDs), which dynamically searches available PRIDs in data tables to effectively use available spaces in a database and create highest utility of the available PRIDs.

Another object of the present invention is to provide a dynamic searching method of provisioning instance identifiers (PRIDs), which can reduce additional searching and translating cost at policy decision point (PDP) or policy enforcement point (PEP) due to corresponding data field retrieval.

To achieve the objects, the present invention provides a dynamic searching method of provisioning instance identifiers (PRIDs), which is applied to a policy-based network management system. The network management system of the present invention includes a network policy database storing a plurality of data tables. Each data table defines N PRIDs to store specific instructions. The N PRIDs respectively define 1 to N field values sequentially. When determining a network policy, the network management system searches the network policy database to find a plurality of data tables used by the network policy, and then sequentially searches each used data table to find an available PRID for assignment.

First, a last data table without PRID assignment used by a network policy in data tables is found. Next, used PRIDs in the last data table are summed up as a count M. If M<N, a used PRID with the greatest field value X is selected, wherein N is the greatest integer limit for every data table and M is an integer. Further, if X<N, an $(X+1)^{th}$ PRID is assigned as a PRID used by the network policy in the last data table, wherein X is an integer. If data tables with unassigned PRIDs are detected, the aforementioned steps are repeated until all data tables are assigned with PRIDs.

Other objects, advantages, and novel features of the invention will become more apparent from the following detailed description when taken in conjunction with the accompanying drawings.

BRIEF DESCRIPTION OF THE DRAWINGS

FIG. 4 is a table of PRID statuses of every data table before adding a new network policy according to the embodiment of the invention.

DETAILED DESCRIPTION OF THE PREFERRED EMBODIMENT

Figure 1:
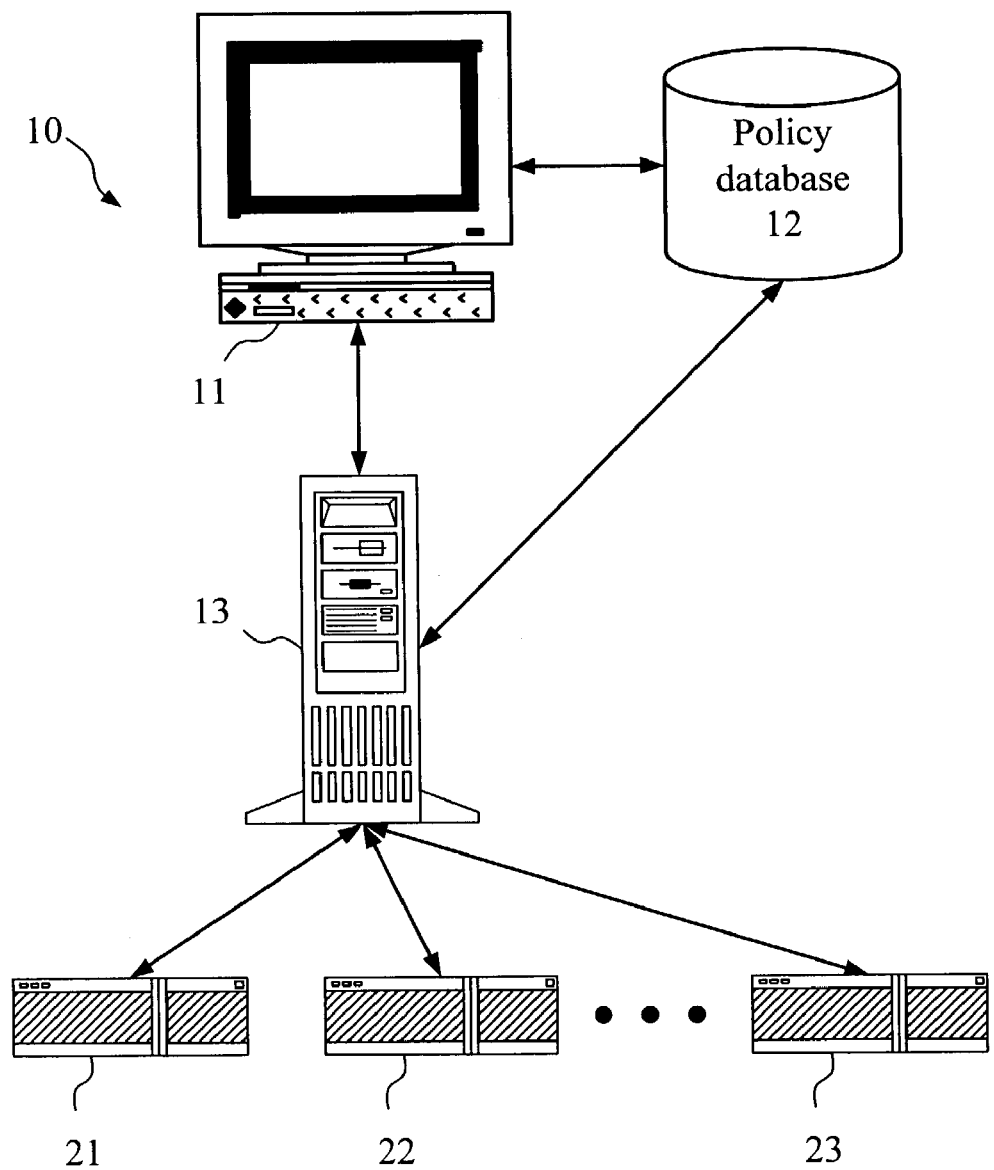
FIG. 1 is a schematic diagram of an embodied environment according to the invention.

With reference to FIG. 1, there is shown a schematic diagram of an embodied environment according to the invention. The policy-based network management system 10 includes a policy management device 11, a policy database 12 and a policy server 13 connected to a plurality of network elements 21, 22, 23 for receiving network polices. The policy management device 11 is an application for editing and modifying network policies by a network administrator. Thus, the network administrator can set network policies required in management through the device 11 and store the polices in the database 12. The policy server 13, also referring to as a policy decision point (PDP), is a relational data management device responsive to distribution of actions of the elements 21, 22, 23 according to the administrator's setting. That is, the server 13 retrieves the content of network policy management from the database 12 when receiving an execution request for network polices, and translates it into the settings of the network elements 21, 22, 23 for operation control. The elements 21, 22, 23, also referring to as policy enforcement points (PEPs), can be routers, firewalls, switches or network elements for dealing with quality of service (QoS).

The network management system 10 is a hierarchical approach, wherein each level is independent and thus a specific management protocol provides communication between levels. For example, the device 11 and the database 12 are communicated by Lightweight Directory Access Protocol (LDAP) while the server 13 and the elements 21, 22, 23 are communicated by Common Open Policy Server (COPS) protocol that creates translation between levels. Thus, final standard data definition format such as policy information base (PIB) or management information base (MIB) is stored in the elements 21, 22, 23 for receiving network policy management.

A plurality of data tables is stored in the database 12. Each data table defines a plurality of PRIDs for storing specific instructions. In this embodiment, the data table defines 255 PRIDs. Storage fields corresponding to each PRID sequentially define 1 to 255 field values such that data is sequentially stored in PRIDs that are not used. For example, in this case, as the first PRID (namely, the PRID with field value 1) is used, next data is stored in the PRID with field value of 2, and similarly, the resting data is sequentially stored in following field value numbers until the data table is filled up. When reaching the greatest limit (i.e., 255), this embodiment then automatically searches for unused field value in the data table to be filled with data. This is different from the prior art. It is noted that in practice, PRIDs can be ranged by unsigned integer with 32-bit or more.

Figure 2:
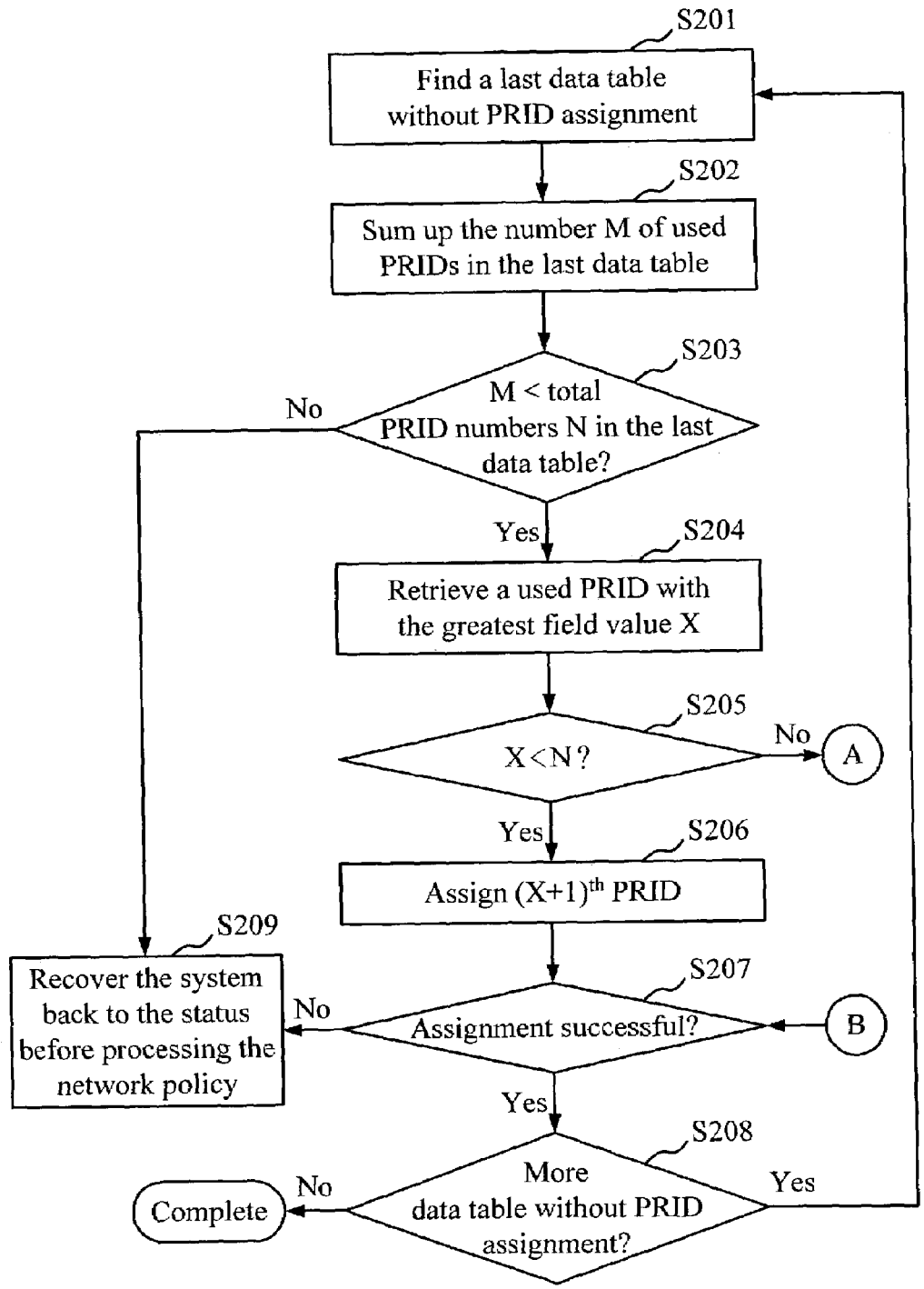
FIG. 2 is a flowchart of one part of an embodiment according to the invention.
Figure 3:
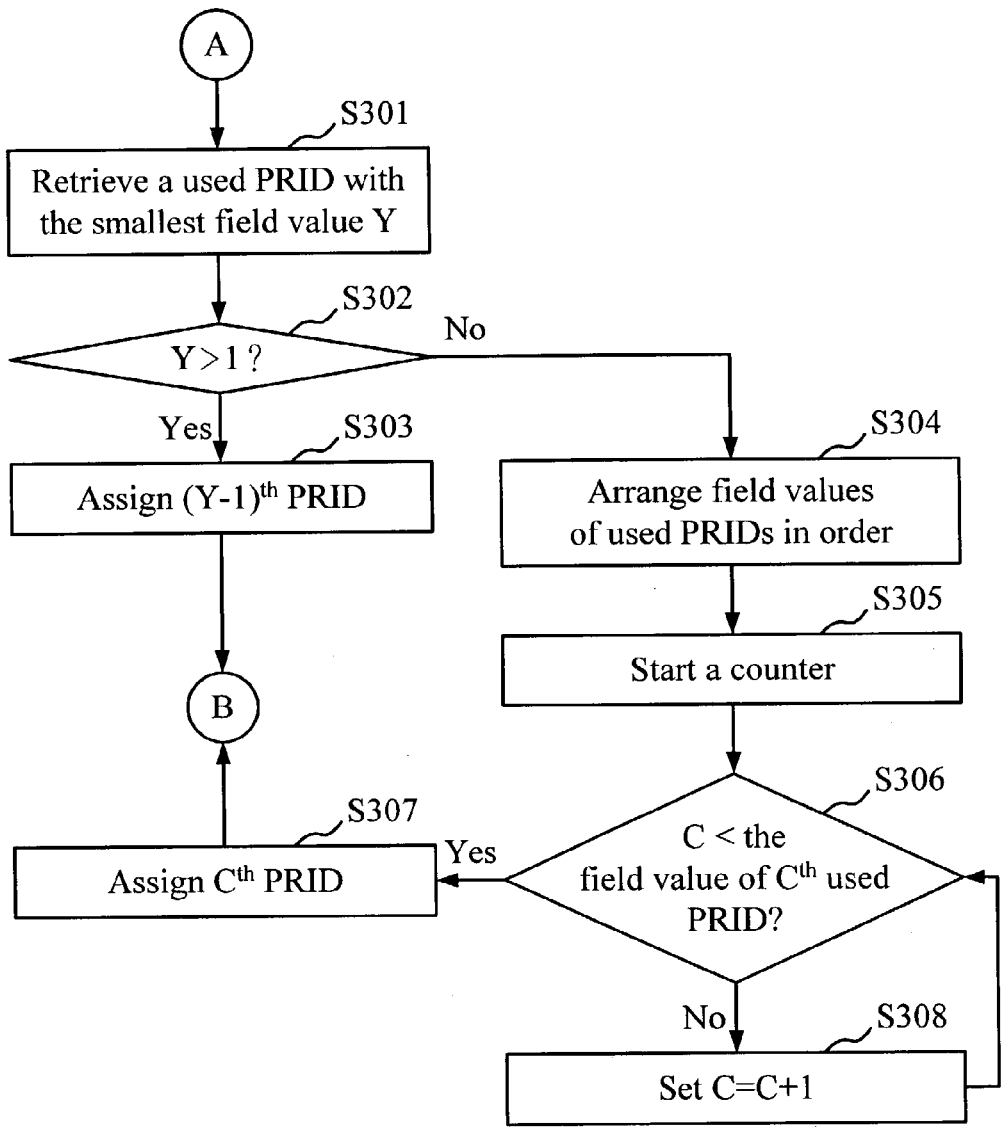
FIG. 3 is a flowchart of the other part of the embodiment according to the invention.

With reference to FIGS. 2 and 3, there is shown a flowchart, wherein the device 11 sequentially find all available PRIDs in every data table from the database 12 when administrator adds a network policy. In this embodiment, the added network policy sequentially uses five data tables T1, T2, T3, T4 and T5, and PRID statuses (used/unused) of every data table are shown in FIG. 4.

First, the database 12 is searched for a last data table with unassigned PRID (S201), namely, data table T5. In the data table T5, two PRIDs (M=2) are counted in assignment to other network policies (S202). Because there are 255 PRID fields in the data table T5 (N=255), available PRIDs are existed in the table T5 for new network policy assignment after comparison (2<255) (S203). In this case, the greatest field value in the used PRIDs of the table T5 is 2 (S204), which is smaller than total PRIDs of 255 (S205). This makes sure that all PRIDs between field values of 3 to 255 are available in the table T5. Therefore, the device 11 assigns the third PRID to this embodiment as a PRID used by the network policy in the table T5 (S206).

After the data table T5 is successfully assigned (S207), the device 11 determines at least one data table without network policy assignment (S208). In this case, it includes data tables T1, T2, T3 and T4. Therefore, the aforementioned steps are repeated from S201 and thus find that the next data table for PRID assignment is the data table T4. The table T4 has five used PRIDs where the greatest field value is 6. According to the flowchart of FIG. 2, the field value of 7 is assigned as a PRID used by the network policy in the table T4 and the table name T5 is filled in one field of the $7^{th}$ PRID of the table T4.

Next, the data table T3 is assigned by the same processes as that in the tables T4 and T5 except for step S205. In the table T3 of step 205, the greatest field value 255 is the same as the total PRID number, thus the increasing logic is not suitable for PRID assignment due to out of the limit range, unless partial network policy deletion is performed. In this case, the smallest field value in all used PRIDs of the table T3 is obtainable to 2 (S301) and all PRIDs with field values smaller than 2 are available PRIDs in the table T3 because the smallest field value is greater than 1 (S302). Therefore, the device 11 assigns the first PRID of the table T3 to this embodiment as a PRID used in the table T3 (S303).

The following PRID assignment is performed for the table T2. The process of PRID assignment to the table T2 is the same as that to the table T3, except that the table T2 has five used PRIDs. However, the greatest and smallest field values used are 255 and 1 respectively in the used PRIDs, so that the device 11 cannot assign a PRID according to the increasing logic or the method of S303 but searches the PRID from PRIDs between the field values of 2 and 254. Therefore, the field values of the used PRIDs in the table T2 are arranged in an order of 1, 2, 3, 5 and 255 (S304) and then a counter is started (S305) for representing a current field position. The field value (1) retrieved from the first used PRID in the table T2 is compared with the count of 1. Because the count of 1 is equal to the field value of 1, the counter is increased by 1 (S308). Next, step S306 is continuously performed until the count is 4. When the field value (5) retrieved from the fourth used PRID is compared to the count of 4, the fourth field value is sure to be blank because the value of 5 is greater than the count of 4. In this case, the fourth field in the table T2 is assigned to this embodiment as a PRID used by the network policy in the table T2 (S307).

Figure 5:
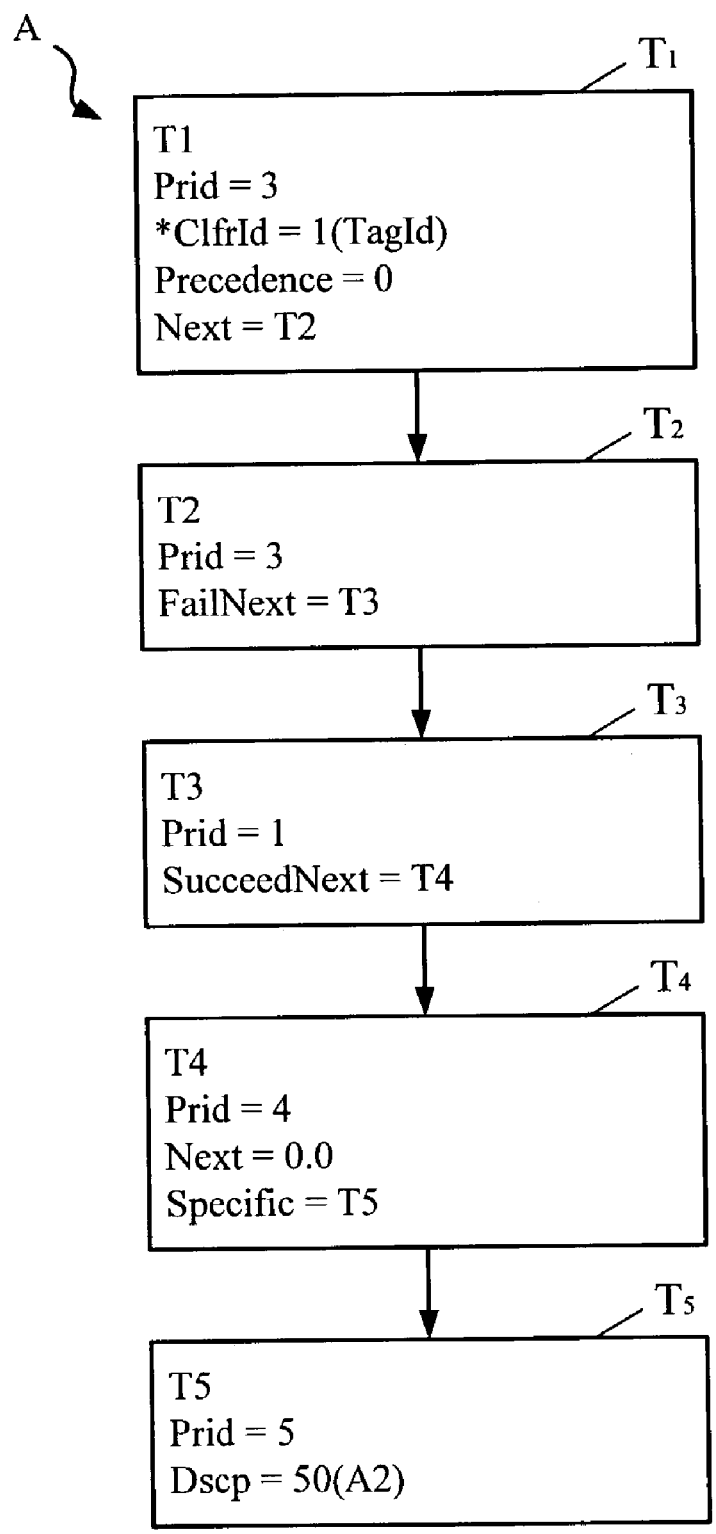
FIG. 5 is a schematic diagram of a relation of data tables used by the new network policy according to the embodiment of the invention.

The process of PRID assignment to the table T1 is the same as that to the tables T4 and T5. The final PRID assignment is selected to the fifth PRID as a PRID used by the network policy in the table T1. FIG. 5 is a schematic diagram of a relationship between data tables used after completely and successfully adding a network policy to this embodiment. With reference to FIG. 5, each data table has its name, used PRID field value, instruction and next assigned data table. When the device 11 performs the network policies of this embodiment, the policy server 13 starts to read data of the data table T1 from the database 12 and sequentially performs instructions defined from the table T2 to the table T5. In this embodiment, the adding write order of network policies is searched from the last data table to the first data table until available PRIDs of all data tables are found and filled with data. The read order of processed network policies is performed from the first data table to the last data table, which is reversed to the write order.

It is noted that the method also includes a rollback mechanism. If data lines in one data table are full as writing a network policy to the database 12, the network policy cannot be completely and successfully written. In this case, previous input data to every data table becomes unmeaningful and the rollback should be performed to recover the system back to the status before processing the network policy (S209), so that the storage spaces for the data tables are released to avoid resource waste.

Accordingly, the invention provides a dynamic searching method of provisioning instance identifiers (PRIDs), which automatically retrieves PRID field values in data tables for a network policy and effectively uses available spaces to further reduce additional searching and translating cost at policy decision point (PDP) or policy enforcement point (PEP) due to corresponding data field retrieval in addition to reaching original PRID functions. As such, the inventive method is improved obviously.

Although the present invention has been explained in relation to its preferred embodiment, it is to be understood that many other possible modifications and variations can be made without departing from the spirit and scope of the invention as hereinafter claimed.

What is claimed is:

1. A dynamic searching method of provisioning instance identifiers (PRIDs), which is applied to a policy-based network management system, the network management system including a network policy database storing a plurality of data tables, each data table defining N PRIDs to store specific instructions, the N PRIDs respectively defining 1 to N field values sequentially, such that when determining a network policy, the network management system searches the network policy database to find a plurality of data tables used by the network policy, and then sequentially searches each used data table to find an available PRID for assignment according to the following steps:
   (A) finding a last data table without PRID assignment used by a network policy in data tables;
   (B) summing up used PRIDs in the last data table as a count M;
   (C) If M<N, selecting a used PRID with the greatest field value X, wherein N is the greatest integer limit for every data table and M is an integer; and
   (D) if X<N, assigning an $(X+1)^{th}$ PRID as a PRID used by the network policy in the last data table, wherein X is an integer, and
   wherein if X=N, the following steps are performed:
      (D1) retrieving the used PRID with the smallest field value Y, wherein Y is an integer; and
      (D2) if Y>1, assigning a $(Y-1)^{th}$ PRID as a PRID used by the network policy in the data table.

2. The method as claimed in claim 1, further comprising a step (E) after the step (D) for continuously performing step (A) if data tables with unassigned PRIDs are detected.

3. The method as claimed in claim 1, wherein in step (C), if M=N, the network management system is recovered back to status before processing the network policy and writing the network policy to the network policy database is stopped.

4. The method as claimed in claim 1, wherein in step D2), if Y=1, the following steps are performed:
   (H) retrieving and queuing field values of the used PRIDs, and starting a counter;
   (I) comparing a count C of the counter and a field value $M_C$ corresponding to a $C^{th}$ used PRID, wherein C and $M_C$ are integers; and
   (J) if $M_C>C$, assigning the $C^{th}$ used PRID of the N used PRIDs as the PRID used by the network policy in the data table.

5. The method as claimed in claim 4, wherein in step (J), if $M_C \leq C$, the counter is increased by 1 and step (I) is continuously performed.

* * * * *